United States Patent [19]

Merenda

[11] Patent Number: 4,889,179
[45] Date of Patent: Dec. 26, 1989

[54] TWO WIRE ADAPTIVE SYSTEM FOR INTERCONNECTING A FOUR WIRE THERMOSTAT AND A FOUR WIRE, HEATING/COOLING SYSTEM

[75] Inventor: Joseph T. Merenda, Northport, N.Y.

[73] Assignee: J. R. Microwave, Inc., Northport, N.Y.

[21] Appl. No.: 125,167

[22] Filed: Nov. 25, 1987

[51] Int. Cl.[4] .................... F25B 29/00; G05D 23/00; G05D 23/30

[52] U.S. Cl. .................... 165/14; 165/26; 165/24; 236/51; 236/68 B; 340/825.42; 340/825.71; 340/825.76

[58] Field of Search .............. 165/26, 27, 24, 25; 236/51, 68 B; 340/825.39, 825.42, 825.71, 825.76

[56] References Cited

U.S. PATENT DOCUMENTS

| | | | |
|---|---|---|---|
| 2,295,442 | 9/1942 | Wilhelm | 340/825.71 |
| 2,731,623 | 1/1956 | Kendall | 340/825.42 |
| 3,550,090 | 12/1970 | Baker, Jr. et al. | 340/825.71 |
| 3,605,877 | 9/1971 | Isaacs et al. | 165/26 |
| 3,815,668 | 6/1974 | Carlson | 236/1 ER |
| 3,945,564 | 3/1976 | Smallegan | 236/46 E |
| 4,083,397 | 4/1978 | Kimpel et al. | 165/26 |
| 4,268,822 | 5/1981 | Olsen | 340/825.71 |
| 4,362,270 | 12/1982 | Cleary et al. | 236/51 |
| 4,425,564 | 1/1984 | Steele | 340/825.42 |
| 4,463,341 | 7/1984 | Iwasaki | 340/825.76 |

FOREIGN PATENT DOCUMENTS

| | | | |
|---|---|---|---|
| 0138389 | 10/1981 | Japan | 340/825.71 |
| 0055341 | 4/1982 | Japan | 236/51 |

Primary Examiner—John Ford
Attorney, Agent, or Firm—Senniger, Powers, Leavitt and Roedel

[57] ABSTRACT

An apparatus for interconnecting a four wire control such as a thermostat and a four wire system such as a heating/cooling system with two wires. An encoder encodes signals provided by the thermostat so that four encoded signals may be transmitted over a two wire system. The apparatus includes inductors which are selectively connected to the thermostat thereby providing varying signals which can be delivered over the two wires between the thermostat and the system.

11 Claims, 4 Drawing Sheets

TWO WIRE ADAPTIVE SYSTEM FOR INTERCONNECTING A FOUR WIRE THERMOSTAT AND A FOUR WIRE, HEATING/COOLING SYSTEM

BACKGROUND OF THE INVENTION

1. Field of The Invention

The invention generally relates to four wire to two wire adaptors and, in particular, a two wire adaptive system for use in place of a four wire system for controlling a heating/cooling system.

2. Description of The Prior Art

Forced air central heating and cooling systems for domestic use generally use common ductwork for both warm and cool air. A typical heat-only system is shown in FIG. 1 while a system that provides both heat and air conditioning is shown in FIG. 2.

In a heat-only system of FIG. 1, the room thermostat 10 is simply a temperature-controlled switch that enables electric current to flow to the heat control 20 of furnace 30. The heat control 20 activates the fan 32 and combustion chamber 31 so that fan 32 forces air over heat exchanger 33 and the air temperature is increased. Therefore, only two wires 21 and 22 are required for the connection between the furnace 30 and thermostat 10.

When air-conditioning is added as shown in FIG. 2, a more complex thermostat 100 must be used to contact the heat/cool system 130. The thermostat 100 is a temperature controlled switch with multiple contacts. Electric current flows through the thermostat contacts 100 to the heat/cool control 120. In addition, all heating-/cooling systems have a separate, manually-controlled switch F on the thermostat 100 that enables the homeowner to have the fan 132 run continuously for constant circulation air. Therefore, heating/cooling systems require four wires 121, 122, 123, 124 to be run between the thermostat 100 and control 120.

During heating cycles, control 120 activates fan 132 and the combustion chamber 131 so that fan 132 forces air over heat exchanger 133 and the air temperature is increased. During cooling cycles, control 120 activates fan 132 and compressor/condenser 140 so that fan 132 forces air over evaporator 141 and the air temperature is decreased. Essentially, such systems require additional wirees 123 and 124 to respond to cooling switch C and fan switch F.

Many older homes were constructed with heat-only systems that have two wires for interconnecting the control systems of the heating plant with the thermostats shown in FIG. 1. As time passes, the owners of these homes wish to add central air conditioning. Installation of central air-conditioning requires two additional wires 123, 124 to be run between the control system and thermostat as shown in FIG. 2. In many homes with finished basements or thermostat wiring that is hidden behind finished walls, it is very difficult, time-consuming and expensive to run the additional wires.

SUMMARY OF THE INVENTION

It is an object of this invention to provide an adaptive system which can be used with a heating and cooling system such that the adaptive system only requires two wires between the thermostat and control units of the heat/cool system.

It is another object of this invention to provide a system having a decoder and an encoder for interconnecting a four wire control such as a thermostat, and a four wire system such as a heating/cooling system, with two wires.

The invention comprises an apparatus for use in combination with a control such as a thermostat. The thermostat has first, second, third and fourth control ports which are associated with first, second, third and fourth system ports of a system such as a heating/cooling system responsive to the control. First means encodes signals provided by the control. The first means has first, second, third and fourth encoding input ports connected to the first, second, third and fourth control ports, respectively. The first means also has first and second encoded output ports. Second means decodes signals provided by the first means. The second means has first and second decoding input ports and first, second, third and fourth decoded output ports connected to the first, second, third and fourth system ports, respectively. Third means interconnects the first and second encoded output ports to the first and second decoding input ports, respectively. Fourth means supplies power to the second means.

These features and objects of the invention as well as others will become apparent to those skilled in the art by referring to the specification and the accompanying drawings in which.

Figure 1:
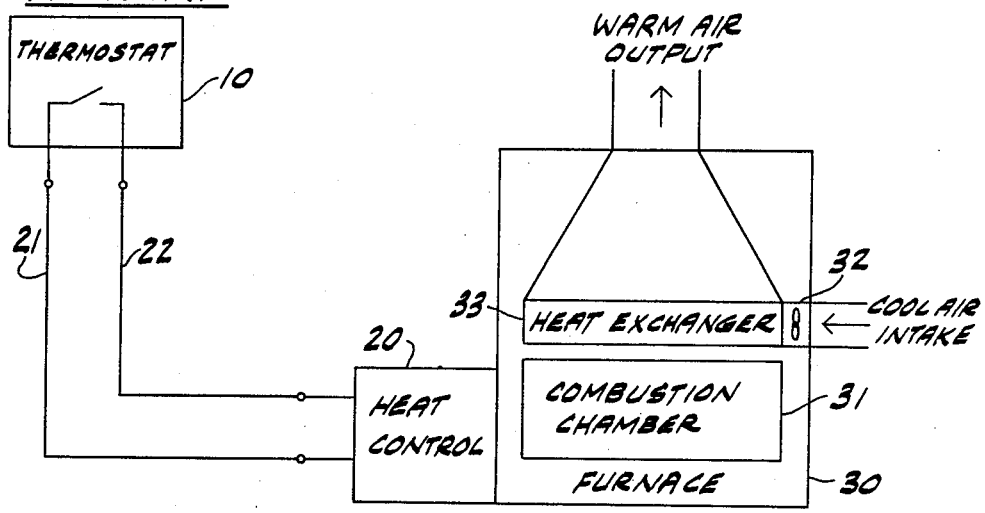
FIG. 1 is a block diagram of a prior art heating system using two wires to interconnect thermostat 10 and heat control 20.
Figure 2:
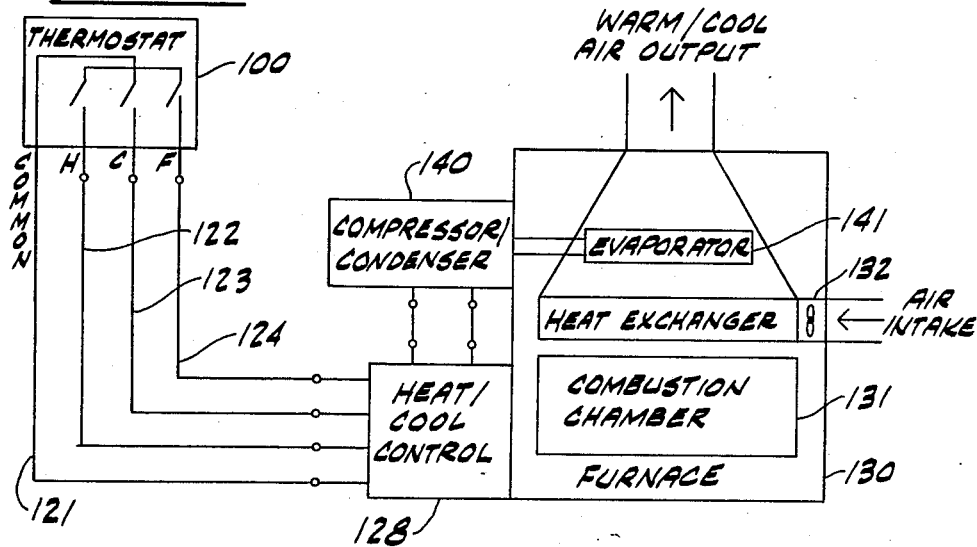
FIG. 2 is a block diagram of a prior art heating and cooling system using four wires to interconnect thermostat 100 with heat/cool control 120.
Figure 3:
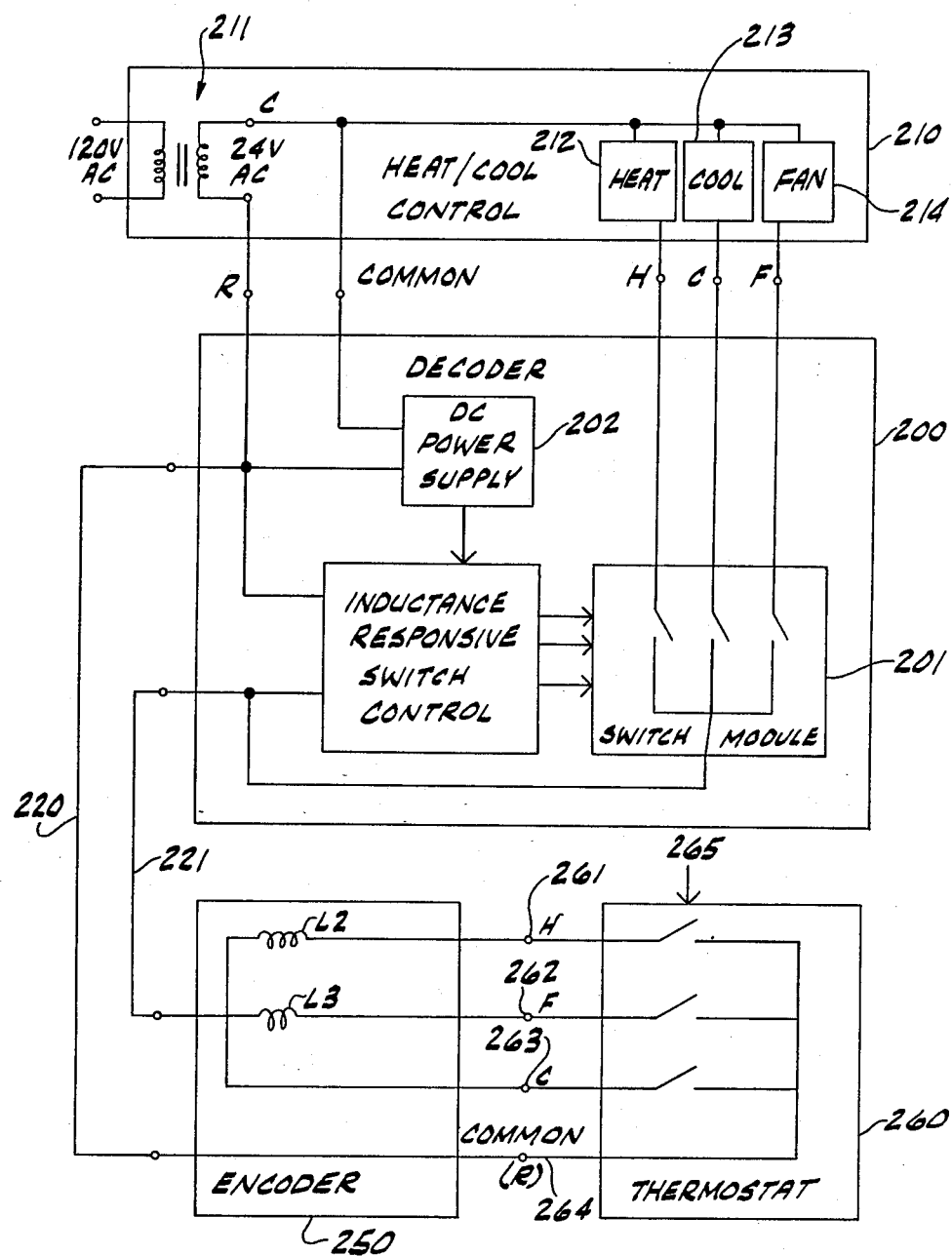

FIG. 3 is a block diagram of a system according to the invention wherein decoder 200 and encoder 250 are interconnected by two wires and are provided between thermostat 260 and heat/cool control 210, each of which has four ports.

Figure 4A:
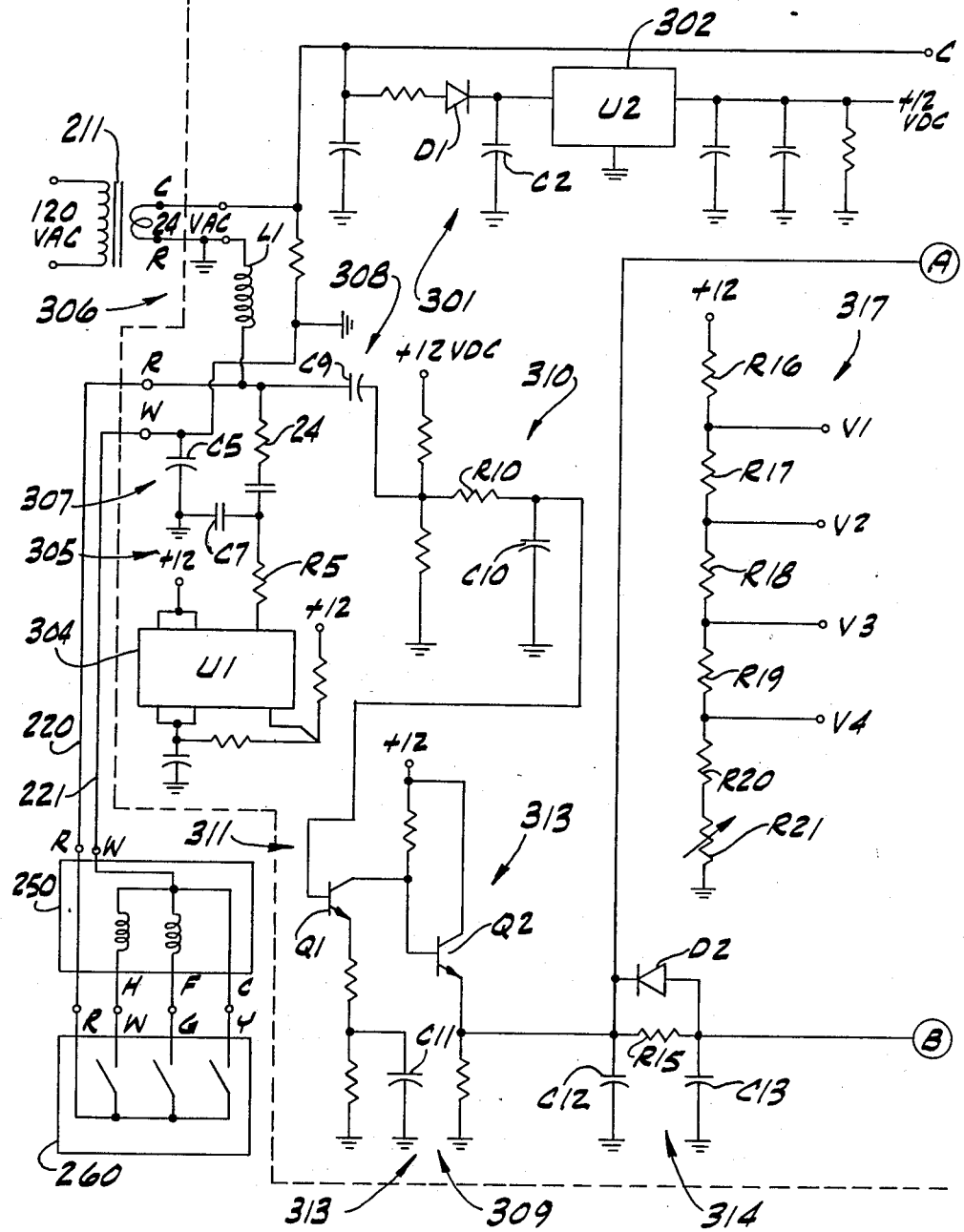
Figure 4B:
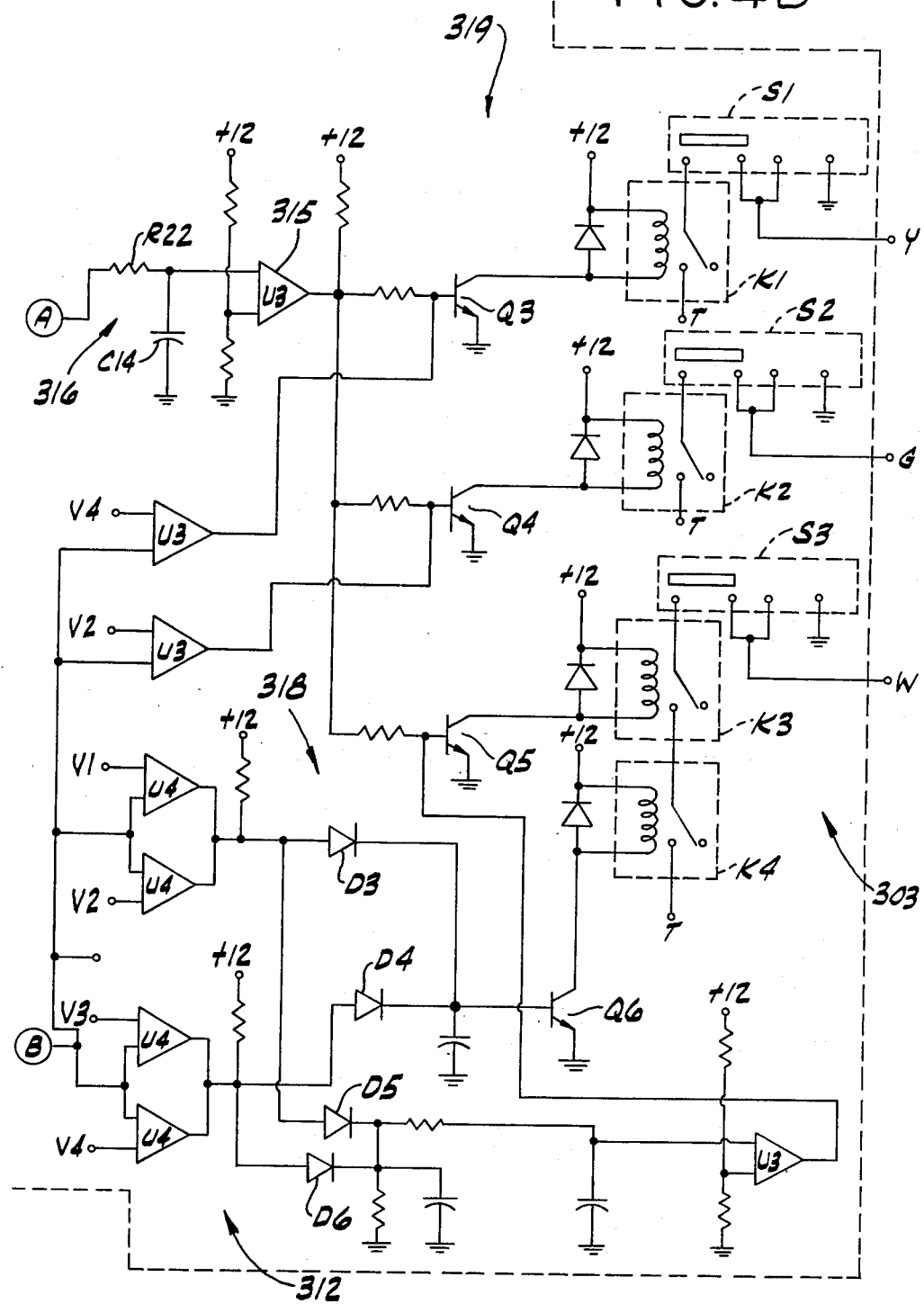

FIGS. 4A and 4B are a schematic diagram of the invention as shown in FIG. 3.

DETAILED DESCRIPTION OF THE INVENTION

The invention comprises an electronic device that enables use of a four terminal heating/cooling thermostat 260 and control 210 with two conductor thermostat wiring. A block diagram of the invention is shown in FIG. 3. The invention consists of two units. Encoder 250 is mounted directly behind the thermostat 260 and adapts the four-wire thermostat output 261–264 to two wires 220, 221. Decoder 200 is mounted adjacent to the heat/cooling control system 210 and decodes the electrical signals on the two wires 220, 221 to provide the three electrical signals H, C, F used to enable operation of the heat, cooling system and fan.

In addition to the implementation described in the following discussion, the invention encompasses any four-to-two wire adaptor. Possible encoding schemes include digital encoding, frequency or phase encoding, DC or RF amplitude discrimination or combinations of the above.

Any four-to-two wire encoding system must satisfy the following requirements:

(A) The system encoder/decoder should be transparent to the heating/cooling system. Hence, the encoder/decoder should not affect heating/cooling operation nor should the system require any different adjustments or modifications from one that uses four wires. The encoder/decoder should be interchangeable with four wires.

(B) Heating or cooling anticipators should operate normally. All thermostats include anticipators. An anticipator damps the heating/cooling control system, thus preventing large temperature overshoots. It is usually accomplished by small resistive heaters that are integral to the thermostat. The heater "fools" the temperature sensor in the thermostat and results in premature disabling of the system before the room reaches the desired temperature. Since the wattage produced by the anticipator depends on the current passed through the thermostat, it is desirable to have the same electrical current flow through the thermostat as that of a four wire system.

(C) Fail-Safe Operation. Should the electronics that comprise the encoder/decoder fail, it must be insured that the heating system not run continuously. Although not as cruicial to loss of life or property, it is also desirable that the cooling system not run continuously in the event of any failure mode.

(D) Since an adaptor module must be mounted in the wall behind the thermostat, it is desirable for that encoder to be small and simple.

(E) Although not absolutely necessary, it is desirable that the encoder module be passive, i.e., require no electrical power. Although the problem can be overcome by ingenious circuit design, in most cases electrical power at the encoder module will be lost when any of the thermostat contacts close.

A preferred implementation of the invention is shown in the block diagram of FIG. 3. Most heating/cooling control systems operate on 24 VAC. A transformer 211 is integral to the control system. The common output C from the transformer 211 is connected to the heat relay 212, cool relay 213 and fan relay 214. The other transformer output R is routed through the thermostat 260 through the heat, cool and fan control switches 265 to return wires 261–263. Therefore, in a normal 4-wire system, the thermostat 260 closes the circuit to either the heat relay 212, cool relay 213 or fan relay 214.

Since the 60 hertz 24VAC current is not affected by decoder module 200 and encoder module 250, the invention is completely transparent to the heating/cooling system. The unaffected current flow, therefore, does not disturb anticipator operation. Since the current that energizes the relays 212–214 must pass through the thermostat 260, the system is fail-safe. No matter how the encoder 250 might fail, the heat, cool or fan circuits cannot be activated unless the thermostat contacts 265 close. Therefore, the system is as fail-safe as one using four wires. Finally, the encoder module 250 is passive, small, and simple. Therefore, all requirements are met by the invention.

The inductance between the thermostat wires 220 and 221, as seen by the decoder module 200, depends on which thermostat contacts 265 are closed. Therefore, it is possible to determine which functions should be energized by a measurement of the inductance. The invention as shown in FIG. 3 uses a high frequency signal to differentiate between inductance values. It energizes the appropriate electronic switch 201 depending on the measured inductance value. Decoder 200 is powered by regulated DC current provided by DC power supply 202 derived from the 24VAC side of transformer 211.

Since the invention continually monitors the inductance value, it is immune to electrical transients, power surges or momentary RF interference. Those types of interference could interfere with other encoding schemes that rely on pulse patterns. Therefore, the invention is inherently reliable.

The inductance provided by encoder 250 is measured by decoder 200. Decoder 200 imposes a high frequency, oscillating signal across the thermostat wires 220, 221. An encoder inductance 250 that depends on the thermostat contacts 265 is connected across the far end of the thermostat wires 220, 221. In general, a resistor is placed between the high frequency oscillator generating the signal and the thermostat wires 220, 221. Therefore, voltage division occurs between the resistor and inductive reactance of encoder 250. Since the inductive reactance depends on the inductance value, the high frequency voltage across the thermostat terminals will also depend on the inductance value. Therefore, the inductance value can be determined by a measurement of the high frequency voltage.

The frequency of the oscillator which generates the signal for use in a heat/cool system should be chosen based on several considerations. First, the frequency must be high enough for the invention to easily filter out the 60 Hertz signal that is present at the thermostat wire 220, 221. It is also necessary that the frequency be high enough so that the reactance of the inductors L2, L3 will be very small at 60 Hertz, but large enough at the higher frequency to enable accurate measurement of inductance. Second, the frequency must be low enough so that the thermostat wire 220, 221 will be an ineffective antenna at picking up RF interference. The frequency must also be low enough so that the inductance of the thermostat wire 220, 221 that results from transmission line effects will be very small compared to the measured inductance. Otherwise, the measured inductance might depend on the exact installation and would require field adjustment. One frequency that easily satisfies the two requirements is 50 KHz.

The inductance value is least affected by the therostat transmission lines 220, 221 when the inductive reactance to be measured is approximately equal to the characteristic impedance of the transmission lines. A two-conductor thermostat transmission line 220, 221 has a characteristic impedance that varies between 50 and 150 ohms. Therefore, the inductor values should be chosen to provide reactances at 50 KHz in that range. For example, 300$\mu$H and 200$\mu$H may be the inductor values. The selected combination of frequency and inductance enables the use of up to 150 feet of thermostat wire 220, 221 between encoder 250 and decoder 200 without affecting circuit operation.

The schematic of the invention is shown in FIGS. 4A and 4B. The 24VAC signal provided by transformer 211 is rectified by D1 and C2 at 301 to form DC. The three terminal regulator 302 (U2) provides a precise 12VDC to power the electronic circuit. Relays K1 through K4 at 303 are used as electronically controlled switches that enable either the heat (W), cool (Y) or fan (G) circuits. Since operation of the heating/cooling systems cannot be verified by shorting thermostat terminals, as is normally done, test switches have been provided for that purpose (S1, S2, S3).

A 50KHz square wave is generated by oscillator 304 (U1). The output is divided by the dual division of R5-C7 at 305 and R4-L1 in parallel with inductance encoder at 306. The combination of capacitive and inductive voltage division makes the 50KHz voltage across the inductance independant of frequency. Since the capacitive reactance decreases with frequency, while the inductive reactance increases, the net voltage division is relatively independant of frequency. For the same reason, the dual division enables preservation of the square wave shape across the inductance. Inductive division alone would result in overshoot and distortion and complicate measurement of the high frequency voltage.

C5 at 307 is a very low impedance at 50KHz, effectively grounding the W thermostat wire terminal at the high frequency. The choke (L1 at 306) is a high impedance at 50KHz, thereby masking the transformer impedance from the measurement circuit.

The 60 Hertz signal that is present across the thermostat wires is filtered by the combinationn of C9 at 308 and C11 at 309 that form a two pole high pass filter. Both capacitors are very low impedances at 50KHz. High frequency interference is filtered by the low pass filter formed by R10 and C10 at 310. Transistor 311 (Q1) amplifies the 50KHz signal and transistor (QZ) at 313 connected as a peak detector converts the 50KHz signal to a DC level that is proportional to the amplitude of the high frequency signal. The relative DC voltages as a function of thermostat contacts is shown in the following table:

| THERMOSTAT CONTACT | STATUS | | | | | |
|---|---|---|---|---|---|---|
|  | 1 | 2 | 3 | 4 | 5 | 6 |
| COOL | C | C | O | O | O | O |
| FAN | O | C | C | C | O | O |
| HEAT | O | O | C | O | C | O |
| RELATIVE VOLTAGE | 5.4 | 5.4 | 6.2 | 7.0 | 7.8 | 9.5 |

C = CLOSED
O = OPEN

As shown in the table, status 1 is the cooling cycle wherein the cooling thermostat contact is closed and the other contacts remain open. This generates a relative voltage of 5.4 volts. Status 2 is the cooling cycle with the manual fan switch also closed and this also generates a relative voltage of 5.4 volts. Status 1 and 2, therefore, differ only in the manual switching of the fan contact. Both status 1 and 2 have identical voltages for the reason that whenever the cooling contact closes, the fan switch automatically closes to prevent cooling compressor damage. Status 3 is the heat cycle with the manual fan switch closed. This generates a relative voltage of 6.2 volts. Status 4 is the fan cycle with only the manual fan thermostat contact switch closed. This status 4 generates a relative voltage of 7.0 volts. Status 5 is the heat cycle where the heat thermostat contact switch is the only switch closed and a relative voltage of 7.8 volts is generated. Finally, status 6 is the condition where all thermostat contact switches are open and this generates a relative voltage of 9.5 volts. Since each unique status generates a different relative voltage, it is possible by detecting the relative voltage, to accurately control the furnace.

The 8 comparators 312 (U3 and U4) sense whether a voltage is above or below a reference level. U3 and U4 are used to sense the range in which the DC voltage appears and are connected to logic circuits that enable the correct electronic switch 201.

The output of the detector (transistor Q2 at 313) is delayed by the network C12-R15-C13-D2 at 314. The delay circuit prevents the decoder circuit from responding to momentary aberrations in the detected voltage that might be caused by electrical transients. A single comparator 315 (U3) is connected to the non-delayed DC voltage through R22 and C14 at 316. The comparator 315 senses whether all thermostat contacts are open (DC voltage greater than 9.0V). If so, it disables all switch drivers. In addition, R22 and C14 at 316 form a delay much longer than the other delay circuit at 314. Therefore, as the DC voltage settles to its final value during a change of thermostat state, the outputs are disabled. In that way, the outputs will not cycle through various states as the voltage settles to a final value.

The referene voltages for each of the remaining comparators are set by the DC voltage divider formed by R16 through R21 at 317. A single adjustment (R21) is used to optimize the values. The frequency-independent implementation enables use of a simple adjustment.

To prevent evaporator freeze-up and possible compressor damage, all cooling thermostats are designed so that the fan is enabled whenever the cooling contact closes. Therefore, in the cooling state, the fan switch must be energized.

Whenever the detected voltage is below 7.4V (V2), the U3 comparator enables the fan switch driver. Whenever the voltage is below 5.8V (V4), the cooling driver is enabled by the U3 comparator connected to V4. The heat must be energized whenever the voltage is between 5.8 (V4) and 6.6 (V3) or when it is between 7.4(V2) and 8.2(V1). The comparators 312 in U4 detect whether the voltage lies within either of those windows. D3-D4 and D5-D6 form OR logic 318. The heat will be enabled for either condition.

The heat is enabled by two switches in series. The redundant switching provides further fail-safe protection because there is one failure mode that could cause continuous heat. When the fan is set to continuous ON by the thermostat, 60 Hertz power is always available at the electronic switch. Therefore, should the heat switch driver fail during that condition, the heat could operate continuously. A dual switch driver by separate circuitry makes that scenario highly unlikely since both switch drivers must fail simultaneously in the ON mode. The switch drivers are transistor switches Q3 through Q6 at 319.

I claim:

1. An apparatus for use in combination with a control thermostat having first, second, third and fourth control ports which are associated with first, second, third and fourth system ports of a heating/cooling system responsive to the control, said apparatus comprising:

first means for encoding signals provided by the control thermostat, said first means having first, second, third and fourth encoding input ports connected to the first, second, third and fourth control thermostat ports, respectively, and said first means having only first and second encoded ports;

second means for decoding signals provided by the first means, said second means having only first and second decoding ports and having first, second, third and fourth decoded output ports connected to the first, second, third and fourth heating/cooling system ports, respectively;

third means for interconnecting the first and second encoded ports to the first and second decoding ports, respectively; and fourth means for supplying power to said second means.

2. The apparatus of claim 1 wherein said second means comprises fifth means for receiving the encoded signals, the encoded signals being representative of the inductances between the first and second decoding ports and for determining the inductance between the first and second decoding ports and sixth means, responsive to the fifth means, for selectively interconnecting the control ports and the system ports in response to the detected inductance.

3. The apparatus of claim 2 wherein said first means comprises seventh means for varying the inductance between the decoding ports in response to the status of said control ports.

4. The apparatus of claim 3 wherein said first means comprises a first inductor connected between the first encoded port and the first encoding input port, a second inductor connected between the first encoded port and the second encoding input port and wherein the first encoded port is directly connected to the third encoding input port and the second encoded port is directly connected to the fourth encoding input port.

5. The apparatus of claim 4 wherein said fifth means comprises a DC power supply and an inductance responsive switch control circuit and wherein sixth means comprises a switch module circuit responsive to the switch control circuit and selectively connecting the first decoding port to one of the system 6. The apparatus of claim 5 wherein said third means comprises a first wire interconnecting the first encoded port to the first decoding port and a second wire interconnecting the second encoded port to the second decoding port.

7. The apparatus of claim 6 wherein the inductive responsive switch control circuit comprises a high frequency oscillator generating a signal applied to the second encoded port and a means for detecting any resulting voltage difference between the first and second encoded ports.

8. An apparatus for interconnecting the first, second and third control ports of a heat/cool system with the first, second, third switch ports and fourth common port of a thermostat, comprising:
  a DC power supply having a first input connected to one side of a transformer and a second input connected to the fourth common port of said thermostat and the other side of the transformer and having a DC output;
  an inductive responsive switch control circuit having a power input connected to the DC output, control inputs connected to the other side of the transformer and to the first, second and third switch ports of said thermostat via inductors having different values and control output ports; and
  a switch module circuit having control ports connected to the control output ports, having an input port connected to first, second and third switch ports via the inductors and having switched outputs connected to the first, second and third control ports of said heat/cool system.

9. A device for enabling two wire operation of a four port heating/cooling control system in response to a thermostat having a thermostat anticipator comprising:
  first means for encoding signals provided for control of the system by the thermostat, said first means having only two encoded output ports;
  second means for decoding signals provided by the encoded output ports and having four output ports connected to the four port heating/cooling control system,
  wherein said first and second means do not affect the operation of the thermostat anticipator; and
  first and second electrical means for interconnecting the two encoded output ports and the second means for transmitting the encoded signals and carrying thermostat anticipator current.

10. The device of claim 9 wherein the first and second means operate when the thermostat contacts are closed and the contacts are not in a fan continuous on mode thereby providing failsafe operation.

11. The device of claim 9 wherein the second means includes third means, responsive to the second means, for connecting the decoded signal to the four port heating/cooling control system and wherein a control current flows between the thermostat and the heat/cool control when the third means connects the decoded signal to the four port heating/cooling control system and the signals provided for control of the system are unaffected by the first and second means.

* * * * *